US012718486B2

(12) United States Patent
Liu et al.

(10) Patent No.: US 12,718,486 B2
(45) Date of Patent: Aug. 25, 2026

(54) METHOD AND APPARATUS FOR GRAPHICS RENDERING USING A NEURAL PROCESSING UNIT

(71) Applicant: HUAWEI TECHNOLOGIES CO., LTD., Shenzhen (CN)

(72) Inventors: Yang Liu, Kanata (CA); Guoan Sang, Kanata (CA); Mohamed Ibrahim Hafez Ibrahim, Kanata (CA); Keyi Liu, Kanata (CA); Shufang Lu, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 217 days.

(21) Appl. No.: 18/405,703

(22) Filed: Jan. 5, 2024

(65) Prior Publication Data

US 2025/0225734 A1 Jul. 10, 2025

(51) Int. Cl.
*G06T 19/00* (2011.01)
*G06T 15/20* (2011.01)

(52) U.S. Cl.
CPC .............. *G06T 19/00* (2013.01); *G06T 15/20* (2013.01); *G06T 2210/61* (2013.01)

(58) Field of Classification Search
CPC ..... G06T 19/00; G06T 15/20; G06T 2210/61; G06T 17/00; G06T 2207/20084; G06T 15/205
See application file for complete search history.

(56) References Cited

U.S. PATENT DOCUMENTS

2021/0385443 A1* 12/2021 Masule ................ H04N 19/114
2022/0261958 A1* 8/2022 Akkaraju .................. G06T 7/90
2023/0135995 A1* 5/2023 Chen ....................... G06T 12/30 382/131
2023/0326197 A1* 10/2023 Cai ...................... H04N 13/106 382/156
2025/0005765 A1* 1/2025 Rudoy ...................... G06T 7/11
2025/0208790 A1* 6/2025 Gentilin ................ G06F 3/0679

OTHER PUBLICATIONS

Mildenhall, Benjamin. Neural Scene Representations for View Synthesis. Diss.EECS Department, University of California, Berkeley, 2020. (Year: 2020).*

Soto-Chirinos, Jean & Condori Alejo, Henry & Alzamora, Guina. (2023). Neural Rendering in the Cloud with Tensor Processing Unit . 1-7. 10.1109/INTERCON59652.2023.10326073. (Year: 2023).*

Ben Mildenhall et al., "NERF: Representing Scenes as Neural Radiance Fields for View Synthesis", ECCV, Section 3.2.1, Aug. 3, 2020.

* cited by examiner

*Primary Examiner* — Kee M Tung
*Assistant Examiner* — Nauman U Ahmad

(57) ABSTRACT

There is provided a method and apparatus for graphics rendering using a neural processing unit. The method includes receiving, by the NPU, a plurality of images indicative of a 3D scene and scene information indicative of 3D scene and receiving, by the NPU from a graphics processing unit (GPU), intermediate information indicative of a rendering process performed by the GPU and associated with the 3D scene. The method further includes generating, by the NPU, a model of the 3D scene based at least in part on the plurality of images, the scene information and the intermediate information. The method additionally includes inferring, by the NPU, a new image indicative of the 3D scene based on the model of the 3D scene.

19 Claims, 12 Drawing Sheets

METHOD AND APPARATUS FOR GRAPHICS RENDERING USING A NEURAL PROCESSING UNIT

CROSS-REFERENCE TO RELATED APPLICATIONS

This is the first application filed for the present invention.

FIELD

The present disclosure pertains to graphics rendering and in particular to a method and apparatus for graphics rendering using a neural processing unit.

BACKGROUND

A neural processing unit (NPU) was designed to speed up machine learning algorithms, with a hardware artificial intelligence (AI) core, such as Scalar unit, vector unit, and cube unit, to accelerate different types of calculations. For example, in the AI domain a NPU can be especially useful for matrix multiplications. The selection of a different calculation unit is a trade-off between efficiency and flexibility. It is readily understood that an NPU was designed to execute machine learning algorithms and not for graphics rendering.

Neural radiance field (NeRF) is a method based on deep learning for reconstructing a three-dimensional (3D) representation of a scene from two-dimensional (2D) images. NeRF uses neural networks (NN) to learn a 3D scene from 2D images and employs the trained NeRF model to produce an image with a new view direction.

FIG. 1 illustrates the general idea of NeRF. A NeRF is given a set of 2D input images 10 as input, and the neural network uses these 2D images to "implicitly" learn the 3D scene 20 being considered. NeRF employs this trained neural network, namely the neural network trained using the 2D input images, in order to produce one or more images depicting a new view direction 30 of the 3D scene that was implicitly learned by the NeRF using the 2D images.

An advantage of NeRF is that it can use AI acceleration of a NPU in order to produce a photorealistic image. Because NeRF represents the 3D scene in an implicit way using a neural network, the model size is significantly smaller when compared to memory consumption when explicitly storing each point in the 3D volume which defines the image. However, at least one disadvantage with NeRF is that it is not compatible with public graphics application program interfaces (APIs).

Therefore, there is a need for a method and apparatus for graphics rendering using a neural processing unit that obviates or mitigates one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present disclosure is to provide a method and apparatus for graphics rendering using a neural processing unit.

In accordance with embodiments, there is provided a method for of training a neural processing unit (NPU) for graphics rendering. The method includes receiving, by the NPU, a plurality of images indicative of a 3D scene and scene information indicative of 3D scene and receiving, by the NPU from a graphics processing unit (GPU), intermediate information indicative of a rendering process performed by the GPU and associated with the 3D scene. The method further includes generating, by the NPU, a model of the 3D scene based at least in part on the plurality of images, the scene information and the intermediate information. The method additionally includes inferring, by the NPU, a new image indicative of the 3D scene based on the model of the 3D scene.

In some embodiments, the scene information indicative of the 3D scene includes one or more of mesh information, texture information, camera pose information and material information.

In some embodiments, the method further includes receiving, by the NPU from the GPU, a rendered image indicative of the 3D scene rendered by the GPU and modifying, by the NPU, the model of the 3D scene based at least in part on the rendered image received from the GPU.

In some embodiments, the model is a neural radiance field (NeRF). In some embodiments, one or more of the images and the rendered image is a two-dimensional image.

In some embodiments, the method further includes evaluating, by the NPU, an accuracy of the model of the 3D scene, the evaluating based at least in part on a comparison of the new image and the rendered image received from the GPU. In some embodiments, upon the accuracy reaching a threshold, the method further includes receiving, by the NPU, a request for inferring another new image indicative of the 3D scene.

In accordance with embodiments, there is provided a neural processing unit (NPU) including a processor and a memory storing instructions thereon, the instructions when execute by the processor configure the NPU to perform one or more of the above methods or other methods discussed elsewhere herein.

In accordance with embodiments, there is provided a system for training a neural processing unit (NPU) for graphics rendering, the system including a graphics processing unit (GPU) communicatively linked to a neural processing unit (NPU). The GPU is configured to receive images of a three-dimensional (3D) scene, render new view images of the 3D scene and transmit intermediate information to a neural processing unit, the intermediate information of a rendering process performed by the GPU and associated with the 3D scene. The NPU is configured to receive a plurality of images of the 3D scene, receive scene information indicative of the 3D scene and receive the intermediate information. The NPU is further configured to generate a model of the 3D scene based at least in part on the plurality of images, the scene information and the intermediate information and infer a new image indicative of the 3D scene based on the model of the 3D scene.

In some embodiments, wherein the GPU is further configured to transmit rendered new view images of the 3D scene to the NPU. In some embodiments, the NPU is further configured to receive the rendered new view images and modify the model of the 3D scene based at least in part on the rendered new images.

In some embodiments, the NPU is further configured to evaluate an accuracy of the model of the 3D scene, based at least in part on a comparison of the new image and the rendered new view image. Upon the accuracy reaching a threshold, the NPU is further configured to receive a request to infer another new image indicative of the 3D scene.

According to some embodiments, the GPU and the NPU are operatively connected to a rendering application program interface.

Embodiments have been described above in conjunctions with aspects of the present invention upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present disclosure will become apparent from the following detailed description, taken in combination with the appended drawings, in which.

It will be noted that throughout the appended drawings, like features are identified by like reference numerals.

DETAILED DESCRIPTION

Advantages of using a neural processing unit that may include the ability to produce photorealistic images and the requirement of relatively small memory usage when comparing a neural network model size against explicitly storing colors for all points and directions of an image. It has been realised that there is problem with NeRF in that it is not compatible with public graphics rendering application program interfaces (API). For example, NeRF is not compatible with DirectX, OpenGL or Vulkan and thus NeRF cannot be used directly with existing graphics applications. It has also been realised that NeRF requires training time before a new image from a new viewpoint can be generated using NeRF.

As such it is desired to support graphics rendering with a reduced dependency on a graphics processing unit (GPU) utilizing a NPU in order to accelerate graphics rendering. It is also desired that this solution is transparent to existing applications. As such, there is provided a graphics API compatible rendering solution with NPU acceleration.

According to embodiments, there is provided an NPU and GPU joint solution for using neural radiance field to render two-dimensional (2D) images. According to embodiments, there is provided a GPU+NPU pipeline for operation, training and inference processes for this GPU and NPU pipeline.

Figure 1:
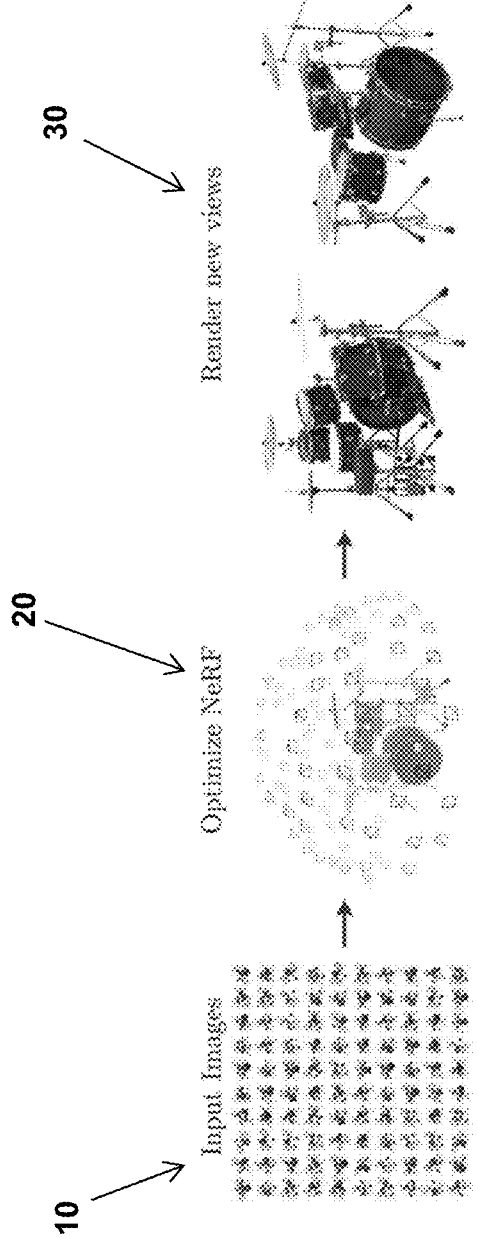
FIG. 1 generally illustrates a method sequence of neural radiance field (NeRF) according to the prior art.
Figure 2A:
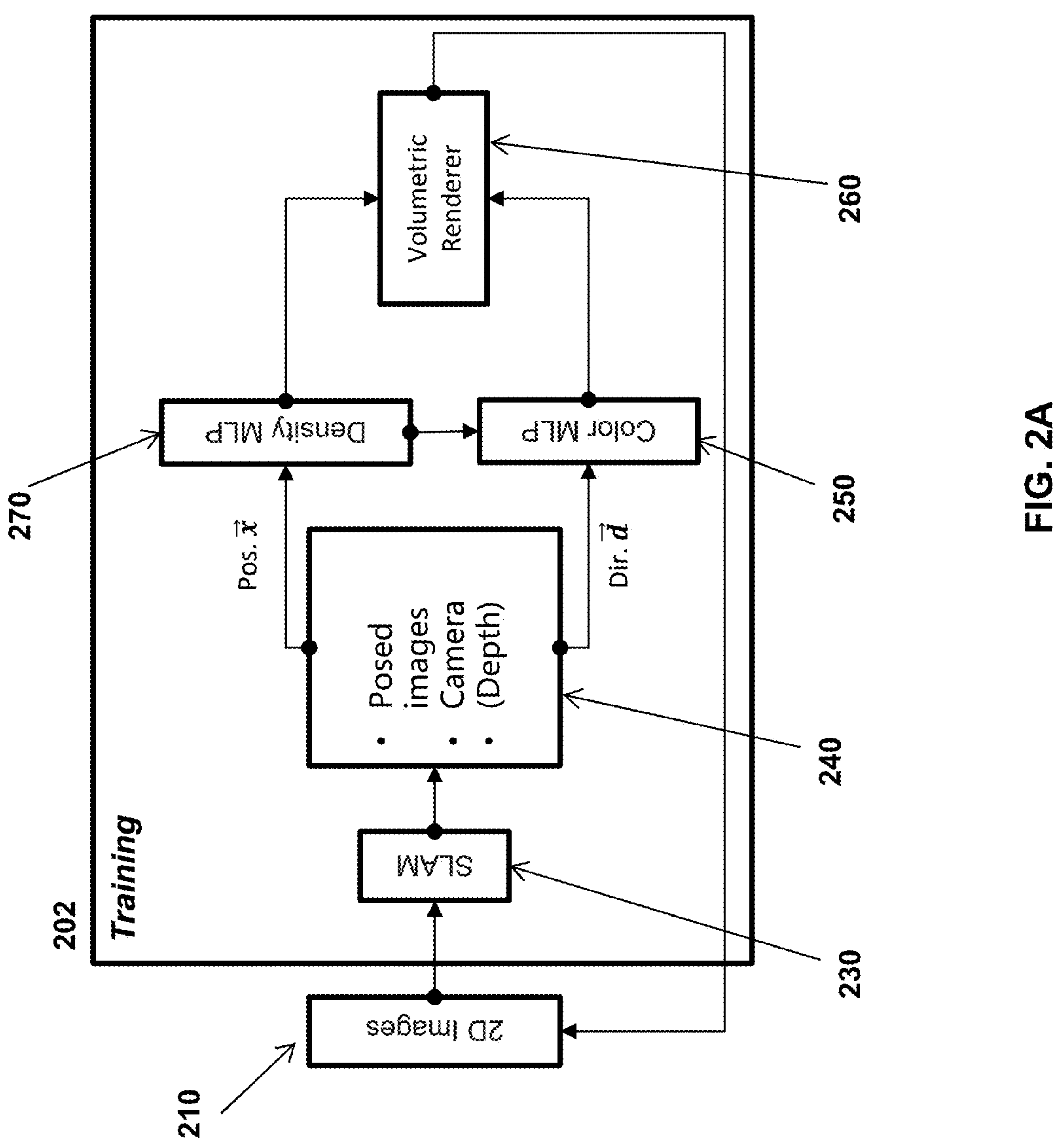
FIG. 2A illustrates a NeRF training sequence, wherein the NeRF is trained using 2D images as input.
Figure 2B:
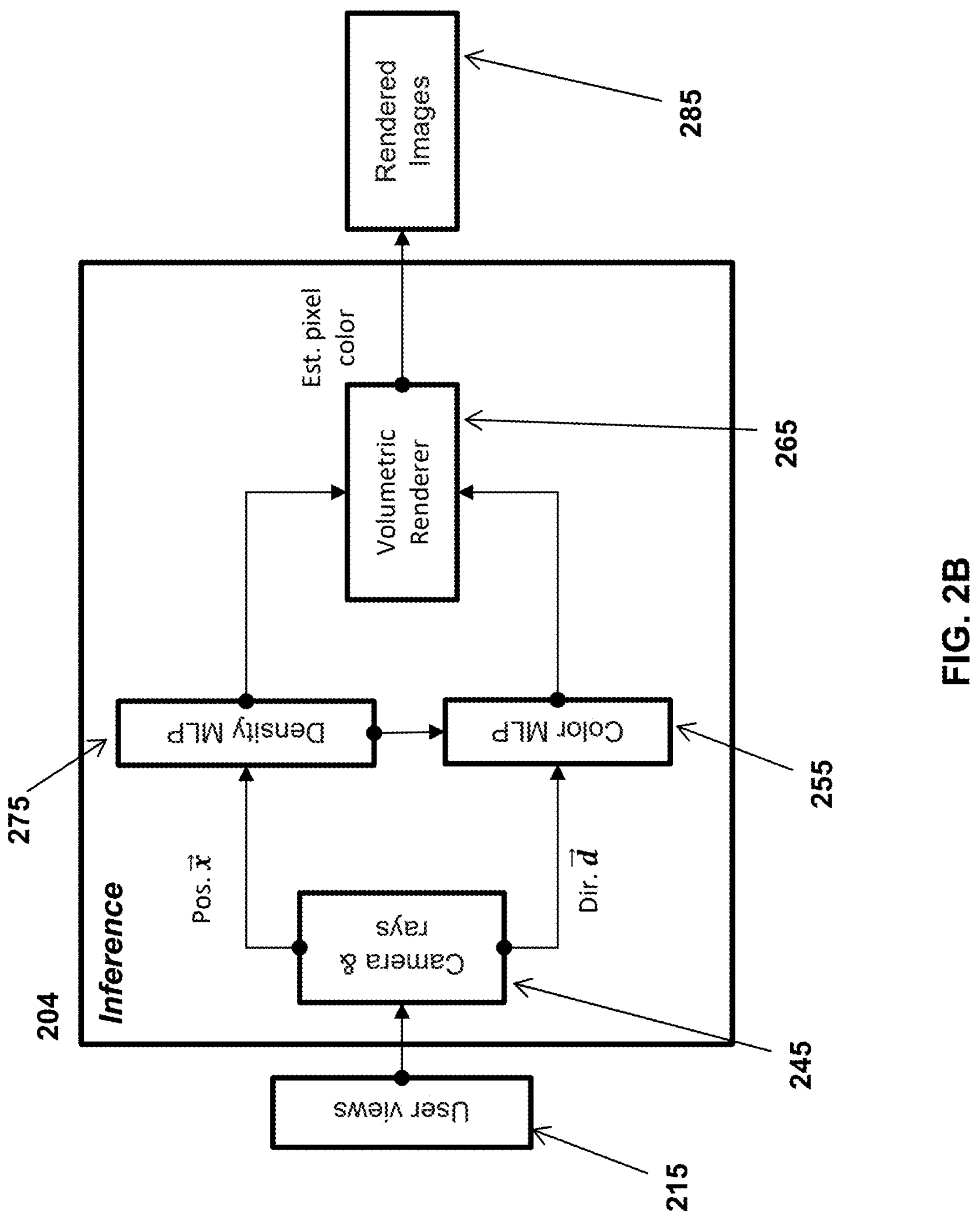
FIG. 2B illustrates the inference performed by the NeRF upon completion of training.

FIG. 2A illustrates a NeRF training 202 sequence, wherein the NeRF is trained using 2D images as input. FIG. 2B illustrates the inference 204 performed by the NeRF upon completion of training.

During training, 2D images (or video) 210 of a scene are used as input for training of the NeRF. Simultaneous localization and mapping (SLAM) 230 may be performed to build a map and localize a device or vehicle in that map at the same time. The output of the SLAM 230 forms the input to two multi-layer perceptrons (MLPs) 250, 270. To generate the color of a pixel on the image, a ray is shot from a camera 240 toward a pixel on the image plane out into the scene. On this ray, multiple samples are obtained. For each sample, it can be determined a world position $\vec{x}$ and a ray direction $\vec{d}$, which will be fed into these two separate MLPs 250, 270. A part of the output from the density MLP 270 is forwarded to the color MLP 250 means that part of the output will be combined with direction $\vec{d}$. The density and color of that sample can be estimated by the density MLP 270 and the color MLP 250, respectively and this information is subsequently forwarded to the volumetric renderer 260. All samples on the same pixel ray will be integrated by the volumetric renderer 260 to obtain the final pixel color on the image. The arrow that points back to the input indicates how the loss is formed, for example the rendered color will be compared with the input pixel color in order to compute the loss and this loss can be used to train the density MLP 270 and the color MLP 250.

Upon completion of the training, NeRF inference 204 can be performed. User views 215 are used as input, wherein user views may specify camera world location and view directions. As an example, this can provide the required camera intrinsic and extrinsic information which may be considered to be similar to the output of the SLAM 230 illustrated in the training process. Given the camera parameters, for example camera pose, similar to the training process, a ray is shot 245 towards a pixel out into the scene and obtains samples along the ray according to the geometry information of the scene that was learned from the training process. For each sample, the world position $\vec{x}$ and the ray direction $\vec{d}$, are defined and are fed into the trained density MLP 275 and the trained color MLP 255, respectively. The estimated pixel density and pixel color determined by the trained density MLP 275 and the trained color MLP 255, for each of the samples along a ray are then integrated by the volumetric renderer 265 to obtain the estimated pixel color. This color is the final image color of the rendered image 285 for subsequent display.

As is known, a multilayer perceptron (MLP) can be considered as a feedforward artificial neural network, including fully connected neurons with a nonlinear kind of activation function, organized in at least three layers, and can be considered notable for being able to distinguish data that is not linearly separable. It is to be understood that MLPs are designed to approximate a continuous function and can solve problems which are not linearly separable. A use case of a MLP is for pattern classification, recognition, prediction and approximation.

As previously noted, according to embodiments, there is provided an NPU and GPU joint solution for using neural radiance field (NeRF) to render two-dimensional (2D) images. According to embodiments, there is provided a GPU+NPU pipeline operation, training and inference processes for this GPU and NPU pipeline.

According to embodiments, the GPU+NPU pipeline for operation incudes two stages of operation. According to embodiments, the first stage of operation is indicative of operation during the training of a neural network associated with the NPU before a neural network is trained. During stage 1, a traditional GPU rendering pipeline can be used to render images based on the viewpoint requested by an application. These rendered images are sent to a client in the same way as would be performed by a current cloud rendering solution. At substantially the same time, 2D images are collected and stored, for example within cloud storage, and these collected images are used to train a neural network, for example a NeRF model, in order for the NeRF model to learn the scene. In addition to using 2D images as input for the training of the neural network (e.g. NeRF model), three-dimensional (3D) scene properties or scene information can also be used during the neural network training process. These 3D scene properties can include one or more mesh properties, texture properties, camera pose properties or other 3D scene properties, as would be readily understood.

According to some embodiments, during the neural network training process (e.g. NeRF training process), at least some information resulting from the GPU rendering process, can be stored memory, for example in a G buffer or other memory configuration, wherein information resulting from the GPU rendering process can be used for additional refinement of the NeRF model during neural network training.

As such, according to embodiments, while the GPU rendering process is being performed and serving clients with rendered images in a traditional manner, in the background, for example within a cloud storage system, a neural network model, for example a NeRF model, is being generated or trained. As such, the training of the neural network, e.g. the NeRF model, is transparent to a user and upon completion of the training of the neural network, the process can transition to stage 2 of the GPU-NPU pipeline.

According to embodiments, the second stage of operation is indicative of operation upon completion of at least the training of the neural network associated with the NPU. Once the neural network is trained, e.g. NeRF model is complete, the neural network operative on a NPU can be used to infer new 2D images, without the necessity of using GPU resources. Utilizing the NPU for the inferring of the new 2D images can enable the computation of these images at a greater speed resulting from the speed of computation associated with an NPU.

Figure 3:
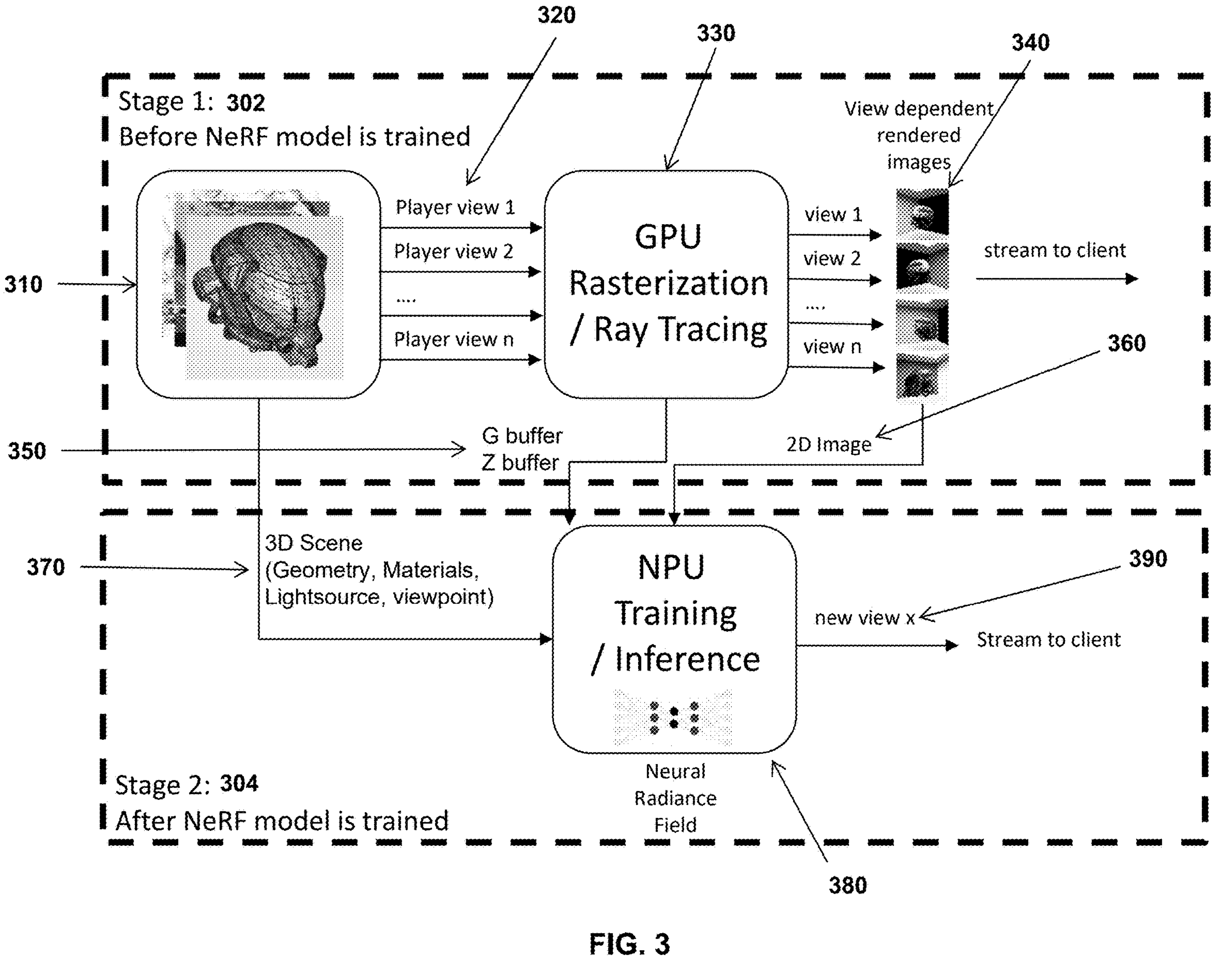
FIG. 3 illustrates a GPU+NPU pipeline of operation, according to embodiments.

FIG. 3 illustrates an example of a GPU+NPU pipeline of operation which incorporates a joint rendering solution, according to embodiments. The first stage of operation 302 is indicative of operation during the training of a neural network (e.g. NeRF) associated with the NPU and the second stage of operation 304 is indicative of operation upon completion of at least the training of the neural network associated with the NPU. As illustrated a 3D scene 310 is being learnt by the NPU during the training period. Initially, during the training period, both the GPU and the NPU are functioning. As such, during the training of the NPU views 320 are provided to the GPU 330 which performs rasterization and ray tracing. The GPU 330 subsequently determines viewpoint-dependent images 340 of the 3D scene which are subsequently transmitted to a client.

Furthermore, during the training process, 3D scene properties 370 is provided to the NPU 380. The 3D scene properties or scene information can include information relating to geometry, materials, light source, view point, mesh properties, texture properties, camera pose properties, material properties or other 3D scene properties or information. During the training process, the GPU 330 can store, for example in a G buffer or Z buffer or other memory, at least some information resulting from the GPU rendering process. This information resulting from the GPU rendering process can transmitted 350 to the NPU and used for further training of the NeRF associated with the NPU. The information resulting from the GPU rendering process can include for example, pixel position, surface normal, surface color, material properties like reflectance, and depth information for each pixel, and 3D information contributing to a particular pixel. For example, in order to compute the color of a pixel, information required may include the number of bounces for all the rays originated from that pixel, the location of those bounces in the 3D scene, material, and normal information of these hit points.

In addition, during the training process the 2D images 340 rendered by the GPU 330 are also transmitted 360 to the NPU thereby providing additional information for the training of the NeRF associated with the NPU 380.

Upon the completion of the training process, namely the training of the NeRF associated with the NPU 380, upon the provision of the 3D scene properties 370, which can include information relating to geometry, materials, light source, view point, mesh properties, texture properties, camera pose properties or other 3D scene properties, to the NPU, the NeRF associated with the NPU can perform inference in order to determine a new view 390 for provision to a client. As discussed elsewhere herein, once the NeRF associated with the NPU has been trained, the computational workload is essentially transferred away from the GPU to the NPU, thereby enabling the GPU to perform other tasks as required.

Figure 4A:
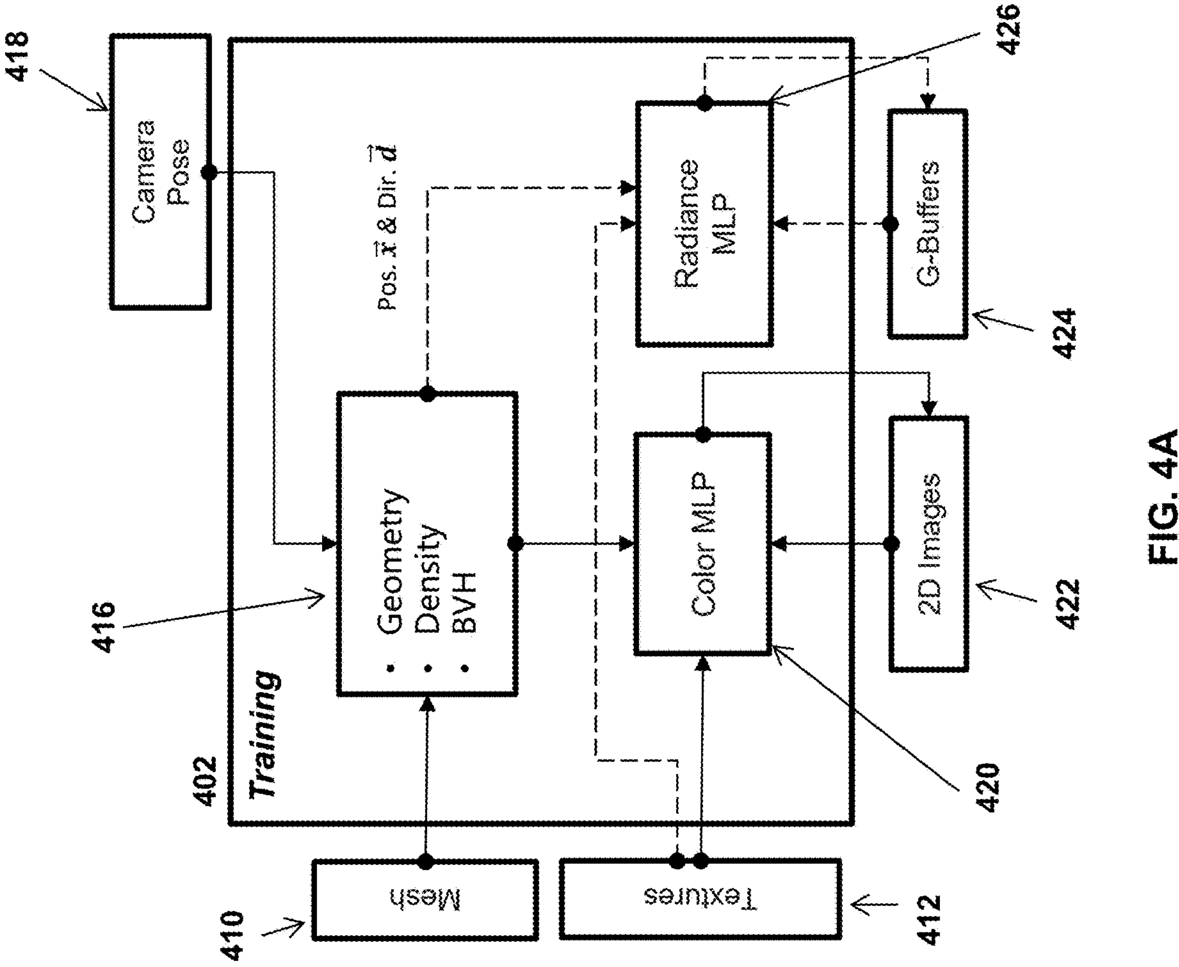
FIG. 4A illustrates a NeRF training sequence according to embodiments of the instant application.

FIG. 4A illustrates a NeRF training 402 sequence according to embodiments of the instant application. As illustrated, information (e.g. scene information) relating to the mesh 410, texture 412, camera pose 418 and other information, which may include for example material properties or other properties or information associated with the 3D scene in question, is made available by the application which is requesting the different views of the 3D scene. It may be considered that the application is the client. This information is passed from the application as additional input to the NPU training process. In particular, the camera pose 418 information and the mesh information 410 is transferred to module 416 which is performing evaluations regarding geometry, density and bound volume hierarchy (BVH). It is to be understood that camera pose 418 information can be considered to be spatial pose, which can represent the position and orientation of a camera that is associated with an image. It is also to be understood that geometry information, for example density and BVH, may be derived from the mesh information.

According to embodiments, the inclusion of the mesh information, which can define the ground truth 3D world position for each point (or mesh) of a 3D scene together with the camera pose, the process to generate the 2D images can be considered to be know. As such, the information used by module 416 is derived from ground truth rather than 2D renderings.

According to embodiments, module 416 evaluates estimates for world position $\bar{x}$ and ray direction $\bar{d}$, which are then transferred to the radiance (density) MLP 426. For evaluations, the radiance MLP 426 additionally receives texture 412 information from the application as well as an input from the G-Buffers 424 which include information regarding the 3D scene which is previously stored on the G-Buffers 424 by the GPU which is performing the image rendering during the training of the NeRF associated with the NPU.

This information provided to module 416 may enable the acceleration of 2D image determination as well as an improvement of accuracy of the neural network associated with the NPU, namely in some examples the NeRF. For example, through the inclusion of camera pose information it can be considered to be a direct evaluation of the accuracy of the camera position and orientation, and thus may not require calculations that are typically performed by SLAM. The use of mesh information can provide a means for increasing the accuracy density determination, without additional training associated with a density MLP. In addition, the use of texture information can provide a base color which can be used to improve training of the color MLP.

According to embodiments, initially the GPU is used to render images as typically performed. These 2D images 422 from the GPU can be used as input to the color MLP 420 in order to further improve the training of the NeRF associated with the NPU, wherein the NeRF can be considered to include the color MLP 420 and the density (or radiance) MLP 426. In addition to receiving the 2D images from the GPU, the color MLP further receives the texture information 412. It is to be understood that during the training 402 of the NeRF associated with the NPU, the GPU is performing the image rendering for the application, and additionally providing the rendered images to the NeRF for further refinement of the training thereof, for example the training of the color MLP 420 and the radiance (density) MLP 426.

Figure 4B:
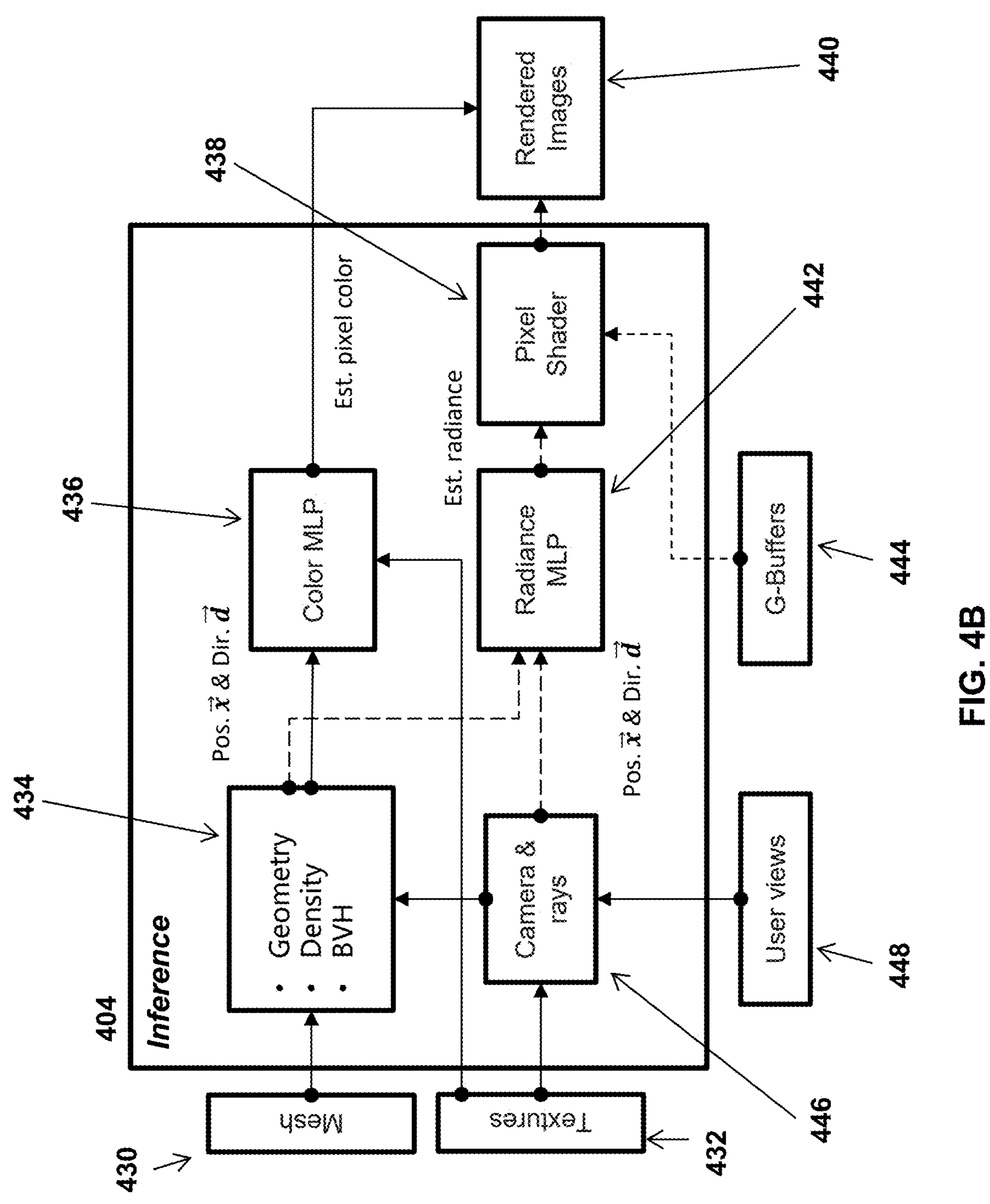
FIG. 4B illustrates a NeRF inference sequence according to embodiments of the instant application.

FIG. 4B illustrates a NeRF inference 404 sequence according to embodiments. Once the NeRF associated with the NPU is trained, NPU can perform the image rendering by inference, thereby reducing the workload associated with the GPU. As such, rendering workload essentially shifts from the GPU to the NPU. In this manner, with limited GPU resources, it can be possible to support more graphics rendering applications with the help from NPU.

As illustrated in FIG. 4B, upon completion of the training of the NeRF associated with the NPU, inference by the NPU 404 can be performed. As illustrated, information relating to the mesh 430 and, texture 432 and optionally other information is made available by the application which is requesting the different views of the 3D scene, wherein this information is associated with the 3D scene in question. At this stage, module 434 which evaluates features of the 3D image including geometry, density and BVH receives the mesh information 430. Texture information 432 is received by the camera and rays module 446, which further receives user views 448 of the 3D image from the application. Output information from the camera and rays module 446 is further provided to module 434 for evaluation of a world position $\bar{x}$ and a ray direction $\bar{d}$ for provision to the color MLP 436. The output of module 434 is further provided to the radiance MLP 442. The radiance MLP 442 further receives output from the camera and rays module 446 which can be representative of a world position $\bar{x}$ and a ray direction $\bar{d}$ determined by the camera and rays 446 module. The radiance MLP determines an estimate of the radiance associated with the pixel under consideration and the color MLP determine an estimate of the color associated with the same pixel. This estimate of the radiance of the pixel is provided to pixel shader 438. It is to be understood that radiance is a directional quantity. For example, radiance may be defined as radiant power travelling in a given direction per unit area per unit solid angle. In addition, a pixel shader can be considered to be a computer program that determine the approximate level of light, darkness and color during the rendering process. The pixel shader 438 additionally receives information from the G-buffers 444, wherein this information can be generated by the GPU based on a view point, wherein this is typically not a full rendering calculation, and thus only partial GPU rendering resources are being used. The output from the color MLP 436 and the pixel shader 438 are subsequently combined in order to determine the rendered image 440.

According to embodiments, illustrated in FIG. 4A and FIG. 4B, pathways between different components have been indicated by a solid line or a dashed line. A solid line has been used in order to indicate a pure artificial intelligence pathway, wherein only the NPU performs inference without any GPU involvement and a dashed line has been used in order to indicate an artificial intelligence hybrid pathway, wherein this pathway includes evaluations performed by both the NPU and the GPU. It can be envisioned that an artificial intelligence hybrid pathway can save or limit the required GPU resources, while in some instances enabling the provision of renderings having an improved quality when compared to solely NPU inference renderings.

According to embodiments, in a hybrid AI pathway the dotted lines can be considered instances where both NPU AI and GPU rendering are combined. In this hybrid mode, G buffer information is generated by a GPU based on a view point. However, it can be considered that G buffer information generation is not a full rendering calculation, as such only a portion of the GPU rendering resources are being used.

According to embodiments rendering can be performed by composing results from multiple rendering passes, and later passes can also use previous pass results as inputs. These previous passes can use information from the G-buffers 444 including, shadow maps, lighting, ambient occlusions, and the like.

According to embodiments, the G-buffers 444 can include information, including depth, normal, world positions, albedo, and the like and the results of some of the rendering passes. The G-buffers 444 can contain intermediate rendering results, and this information typically requires further processing and compositing with other rendering passes to obtain a final image.

According to embodiments, when the G-buffer information to be inferred by the MLPs, the ground truth G-buffers 424 need to be provided by the GPU for training. When in a hybrid mode namely evaluations performed by the NPU and GPU, G-buffers 444 still contain information rendered by the GPU, and the G-buffer 444 information can also be used by the MLPs as auxiliary inputs. The information from the G-buffers and MLP outputs can be composited in order to obtain the final images.

Figure 5:
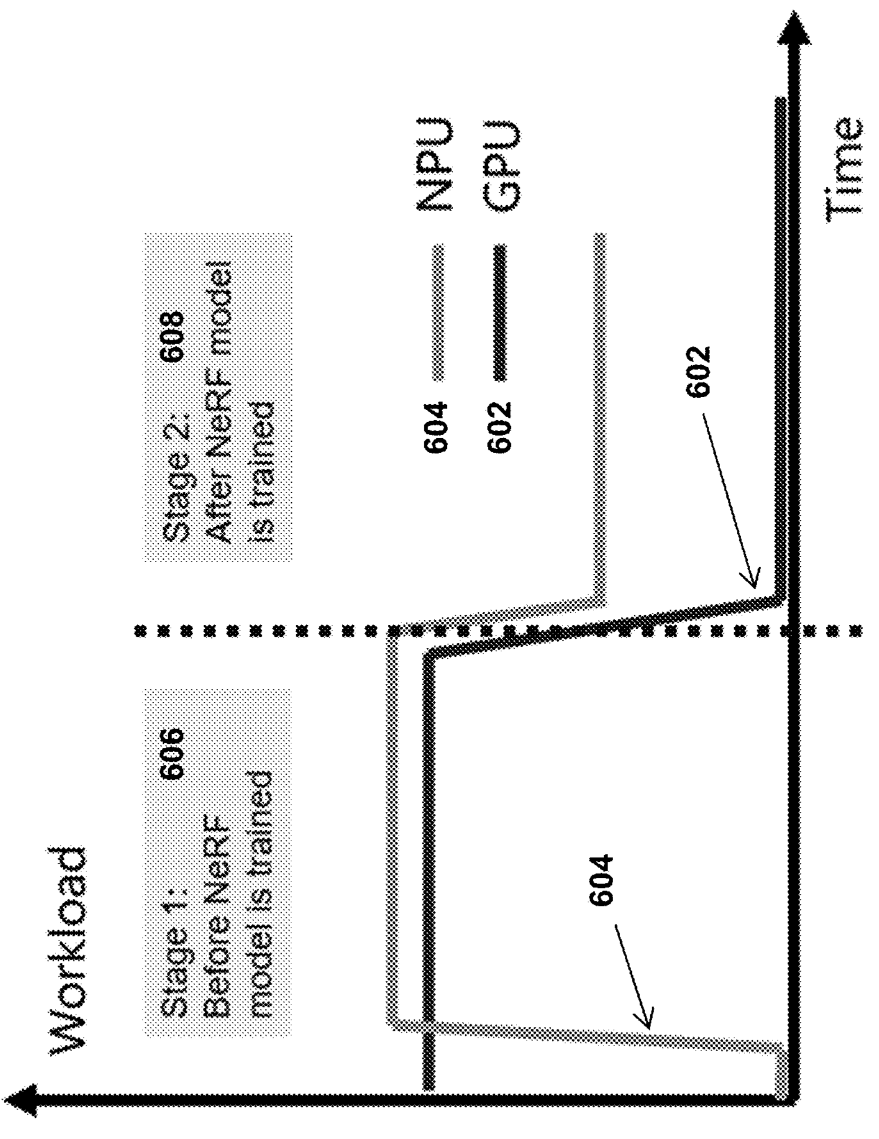
FIG. 5 illustrates a graphic rendering workload over time, illustrating the workload shifting from the GPU to the NPU upon completion of training of the radiance field model (neural network), according to embodiments.

FIG. 5 illustrates a rendering workload is shifting from GPU 602 to NPU 604 after the neural radiance field model is trained. In FIG. 5, that initially in stage 1, namely the NPU training stage 606, the rendering application is supported by both the 602 GPU and the NPU 604. Upon the completion of the training of the NPU and changing to stage 2 608, namely the NPU inference stage, it is clear from FIG. 5 that the workload shifts from GPU to NPU. As such, upon completion of the NPU training, namely entering stage 2, GPU resources can be available for other rendering tasks that may not be ready for performance by the NPU, i.e. that particular NeRF may still be in the training stage (stage 1) or the particular rendering task may be more dynamic and thus may not suitable be suitable for inference evaluation by the NPU.

According to embodiments, the instant application provides a formulation associated with image rendering by a NeRF, where a function is defined on a surface that is learned, via artificial intelligence, using a physically based rendering (PBR) method. PBR methods may also be defined as physically based shading, and can be envisioned as a method of shading and rendering that provides a more accurate representation of how light interacts with material properties.

According to embodiments, input for the training of the NeRF and the inference performed by the trained NeRF includes 2D images, mesh information, texture information and camera pose, which can provide additional details relating to the 3D scene. Furthermore, during the training of the NeRF, information from G-buffers that include details relating to GPU rendered images of the same 3D scene can additionally be used as input.

According to embodiments, the sampling associated with the training of the NeRF and the inference performed by the trained NeRF is configured such that there is 1 sample computed from the input mesh.

Figure 6:
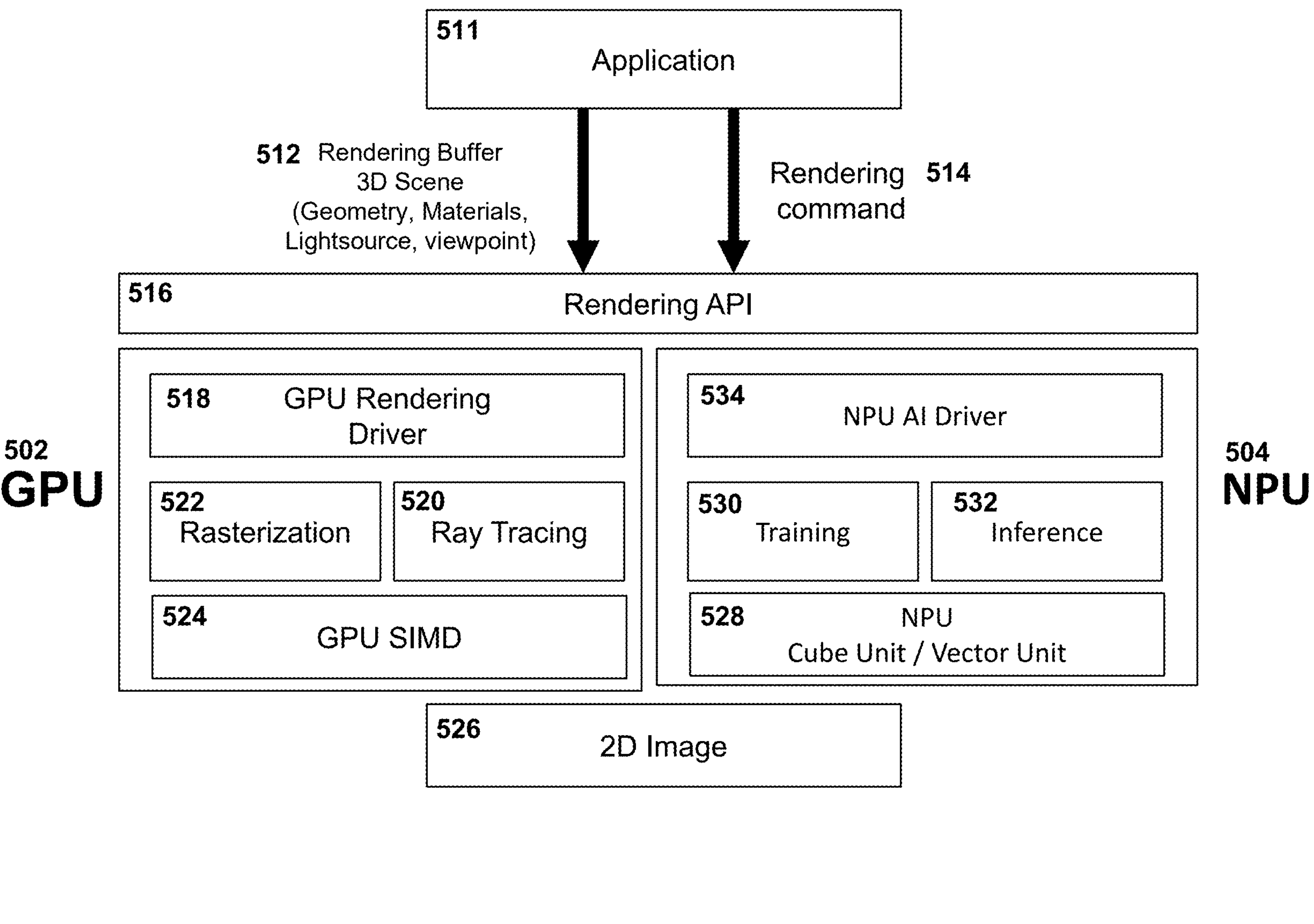
FIG. 6 illustrates system architecture of a GPU+NPU joint rendering system according to embodiments.

FIG. 6 a system architecture of a GPU+NPU joint rendering system, according to embodiments. The application 511 is operatively connected with the rendering application program interface (API) 516. The application 511 can send a rendering command 514 to the rendering application API 516. Additionally, the application can send additional information relating to the 3D scene from the rendering buffer 512 thereof. This additional information can include information relating to the 3D scene, which may include geometry, materials, light source, view point and other information that may be usable during the rendering process activated by the rendering command 514.

Depending on the status of the training of the NPU, the rendering API will send the rendering request to either the GPU or the NPU together with the information from the rendering buffer 512. As previously discussed, the during the training of the NPU the GPU performs the rendering actions and provides the rendered image to the rendering API for provision to the application. In addition, the GPU will be providing this rendered image to the NPU which provides additional training information for the NPU. Once the NPU has completed the training, the rendering API would send the rendering command together with the information from the rendering buffer 512 to the NPU for the rendering of the requested image by inference performed by the NPU. Additionally, as illustrated in FIG. 6, 2D images 526 will further be used as input by the GPU or NPU (once the NPU is trained) or both the GPU and the NPU (when the NPU is still being trained) for the rendering of images activated by the rendering command 514.

The GPU includes a GPU processor which can be configured as a GPU single instructions multiple data (SIMD) 524 processor and a rasterization module 522 and a ray tracing module 520. The operation of which is discussed elsewhere herein. The GPU further comprises a GPU rendering driver, all of which are operatively coupled to perform the required image rendering.

The NPU includes a NPU processor which can be configured as a NPU cube unit/vector unit 528 processor and a training module 530 and an inference module 532, wherein the inference module 532 would be activated once the training of the NPU has been completed. The NPU further includes an NPU artificial intelligence driver 534, all of which are operatively coupled to perform the required training of the NPU and required image rendering upon completion of the training of the NPU.

In some embodiments, the application associated with the system architecture illustrated in for example FIG. 6, is based on or associated with a common rendering API as would typically be associated with a GPU for example. As such for these embodiments, no modification is needed on application side, and as such, the application is unaware of whether the GPU or the NPU was the processing unit that rendered the requested 2D image associated with the 3D scene. As illustrated in FIG. 6, in this embodiment of a GPU and NPU joint rendering platform, all the applications are running in the same way, for example calling the graphics rendering application program interface (API), regardless of whether the rendering is performed by the GPU or the NPU. As such the computing workload shift from the GPU to the NPU is completely transparent to the upper level applications.

As previously discussed, according to embodiments, there is provided a NPU+GPU joint rendering pipeline. In a cloud service system, the NPU+GPU joint rendering pipeline includes a GPU rendering pipeline configured to render images based on the viewpoint request from an application can be performed. These rendered images can be encoded and streamed to client. At the same time, in cloud these 2D images and information from the GPU rendering process, for example information relating to mesh, textures, camera position or pose and the like, and used to train a neural network such that the neural network can learn the 3D scene. Upon the completion of the training the NPU, a new pipeline shifts the graphics rendering workload from GPU to the NPU and the rendering of the 2D images from the 3D scene are performed by inference on the NPU. In this manner, the rendering tasks are less dependent on the GPU and the GPU can be released or made available to carry out other image rendering requests.

According to embodiments, by including camera pose information in the information provided to the NPU, this camera pose information can be used to determine the location of a 2D rendered image, directly and precisely. As such, SLAM may not be necessary to calculate image location. As such, the use of camera pose can subsequently accelerate the training process, and improve its accuracy. It is understood that camera pose can also be defined as spatial pose, which can represent the position and orientation of the camera.

According to embodiments, by including mesh information in the information provided to the NPU, this mesh information can be used to build up density, and as such a density MLP may not be required in order to learn the density distribution of the entire 3D space.

According to embodiments, by including texture information in the information provided to the NPU, the texture information which may include information indicative of a base color texture, this base color texture can be used as an initial value for color MLP training. This texture information may provide for accelerated training and convergence of the neural network.

According to embodiments, depending on the actual workload associated with the graphic rendering as well as depending on the GPU/NPU capacity associated with the overall rendering system, it may be desired to find a balance between GPU and NPU operation in order to fully utilize or optimize the computation resources for attempting to maximize the graphics rendering throughput in the system.

It will be readily understood that the instant application may at least equally be applicable to a variety of different NPUs. For example, NPU is not limited to Huawei Ascend NPU, similar AI accelerated hardware, such as Google TPU, is also applicable to this idea.

Figure 7:
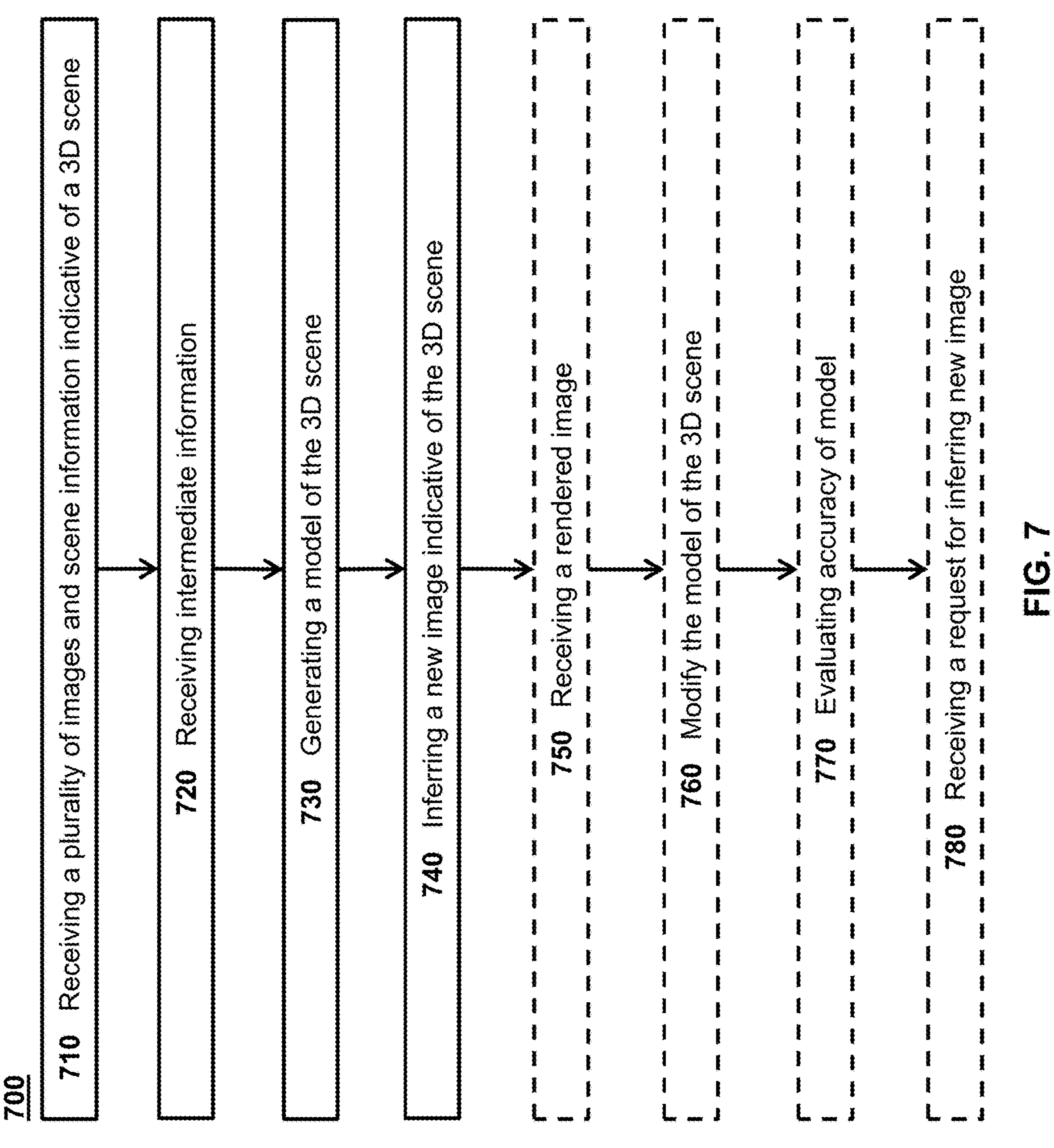
FIG. 7 illustrates a method of image rendering according to embodiments.

FIG. 7 illustrates a method 700 for training a neural processing unit, according to embodiments. The method includes receiving 710, by the NPU, a plurality of images indicative of a 3D scene and scene information indicative of 3D scene and receiving 720, by the NPU from a graphics processing unit (GPU), intermediate information indicative of a rendering process performed by the GPU and associated with the 3D scene. The method further includes generating 730, by the NPU, a model of the 3D scene based at least in part on the plurality of images, the scene information and the intermediate information and inferring 740, by the NPU, a new image indicative of the 3D scene based on the model of the 3D scene.

In some embodiments, the method further includes receiving 750, by the NPU from the GPU, a rendered image indicative of the 3D scene rendered by the GPU and modifying 760, by the NPU, the model of the 3D scene based at least in part on the rendered image received from the GPU.

In some embodiments, the method further includes evaluating 770, by the NPU, an accuracy of the model of the 3D scene, the evaluating based at least in part on a comparison of the new image and the rendered image received from the GPU. Upon the accuracy reaching a threshold, the method further includes receiving 780, by the NPU, a request for inferring another new image indicative of the 3D scene.

In some embodiments, the scene information indicative of the 3D scene includes one or more of mesh information, texture information, camera pose information and material information. In some embodiments, the model is a neural radiance field (NeRF).

Figure 8:
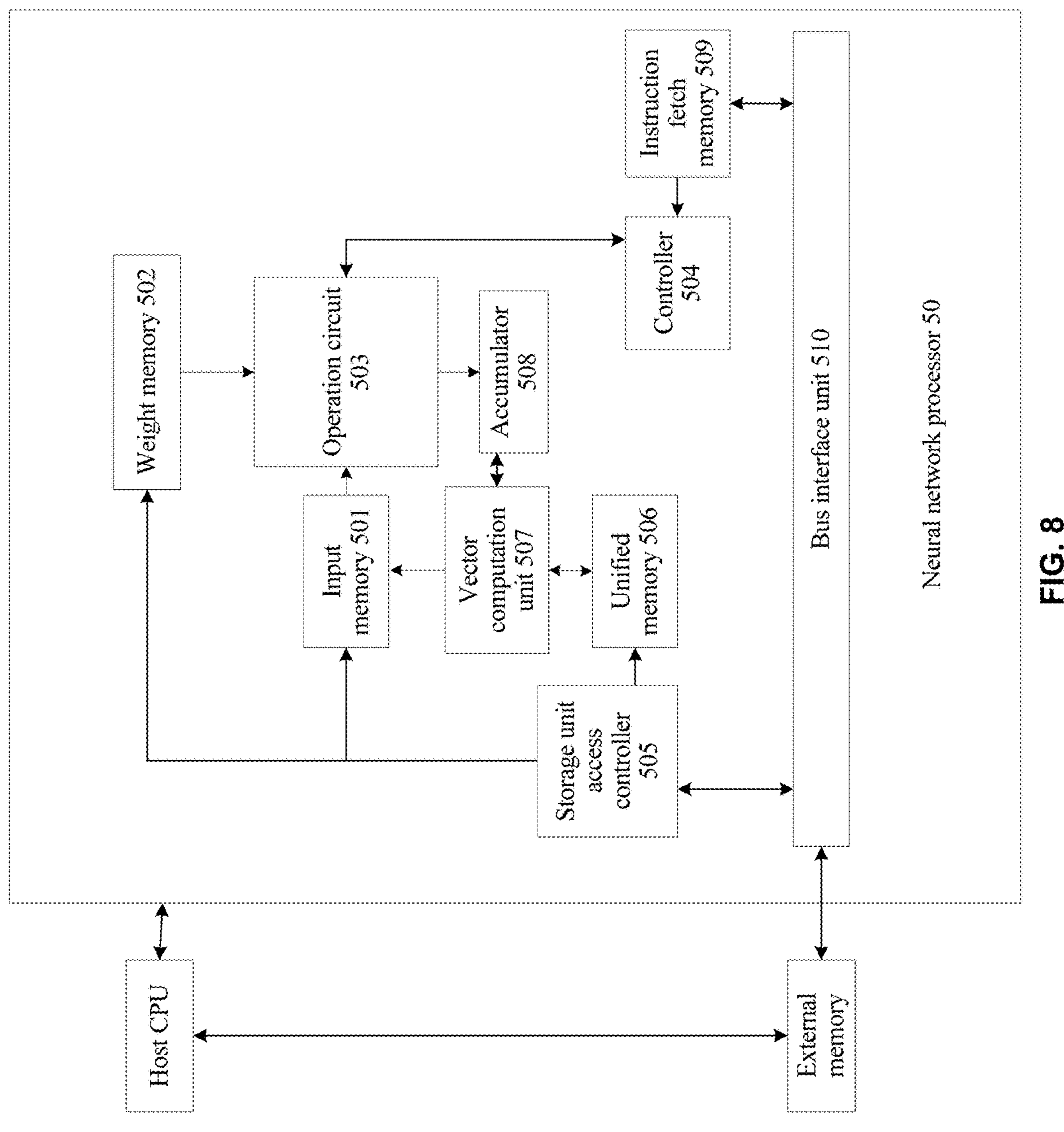
FIG. 8 is a schematic structural diagram of a neural network processor which can be used in implementations, according to embodiments.

FIG. 8 is a schematic structural diagram of a neural network processor which can be used in implementations, according to embodiments. The neural network processor (NPU) 50 is mounted, as a coprocessor, to a host CPU (Host CPU), and the host CPU allocates a task. A core part of the NPU is an operation circuit 503. A controller 504 controls the operation circuit 503 to extract matrix data from a memory and perform a multiplication operation.

In some implementations, the operation circuit 503 internally includes a plurality of processing units (process engine, PE). In some implementations, the operation circuit 503 is a bi-dimensional systolic array. In addition, the operation circuit 503 may be a uni-dimensional systolic array or another electronic circuit that can implement a mathematical operation such as multiplication and addition. In some implementations, the operation circuit 503 is a general matrix processor.

For example, it is assumed that there are an input matrix A, a weight matrix B, and an output matrix C. The operation circuit obtains, from a weight memory 502, data corresponding to the matrix B, and caches the data in each PE in the operation circuit. The operation circuit obtains data of the matrix A from an input memory 501, and performs a matrix operation on the data of the matrix A and the data of the matrix B. An obtained partial or final matrix result is stored in an accumulator (accumulator) 508.

A unified memory 506 is configured to store input data and output data. Weight data is directly moved to the weight memory 502 by using a storage unit access controller (direct memory access controller, DMAC) 505. The input data is also moved to the unified memory 506 by using the DMAC.

A BIU is a bus interface unit, that is, a bus interface unit 510, configured to enable an AXI bus to interact with the DMAC and an instruction fetch memory (e.g. instruction fetch buffer) 509.

The bus interface unit (BIU) 510 is configured to enable the instruction fetch memory 509 to obtain an instruction from an external memory, and is further configured to enable the storage unit access controller 505 to obtain, from the external memory, source data of the input matrix A or the weight matrix B.

The DMAC is mainly configured to move input data from an external memory DDR to the unified memory 506, or move the weight data to the weight memory 502, or move the input data to the input memory 501.

A vector computation unit 507 includes a plurality of operation processing units. If needed, the vector computation unit 507 performs further processing, for example, vector multiplication, vector addition, an exponent operation, a logarithm operation, or magnitude comparison, on an output from the operation circuit. The vector computation unit 507 is mainly used for non-convolutional/FC-layer network computation in a neural network, for example, pooling (pooling), batch normalization (batch normalization), or local response normalization (local response normalization).

In some implementations, the vector computation unit 507 can store, to the unified buffer 506, a vector output through processing. For example, the vector computation unit 507 may apply a nonlinear function to an output of the operation circuit 503, for example, a vector of an accumulated value, to generate an activation value. In some implementations, the vector computation unit 507 generates a normalized value, a combined value, or both a normalized value and a combined value. In some implementations, the vector output through processing may be used as activation input to the operation circuit 503, for example, to be used in a following layer of the neural network.

The instruction fetch memory (e.g. instruction fetch buffer) 509 connected to the controller 504 is configured to store an instruction used by the controller 504.

The unified memory 506, the input memory 501, the weight memory 502, and the instruction fetch memory 509 are all on-chip memories. The external memory is independent from the hardware architecture of the NPU.

Figure 9:
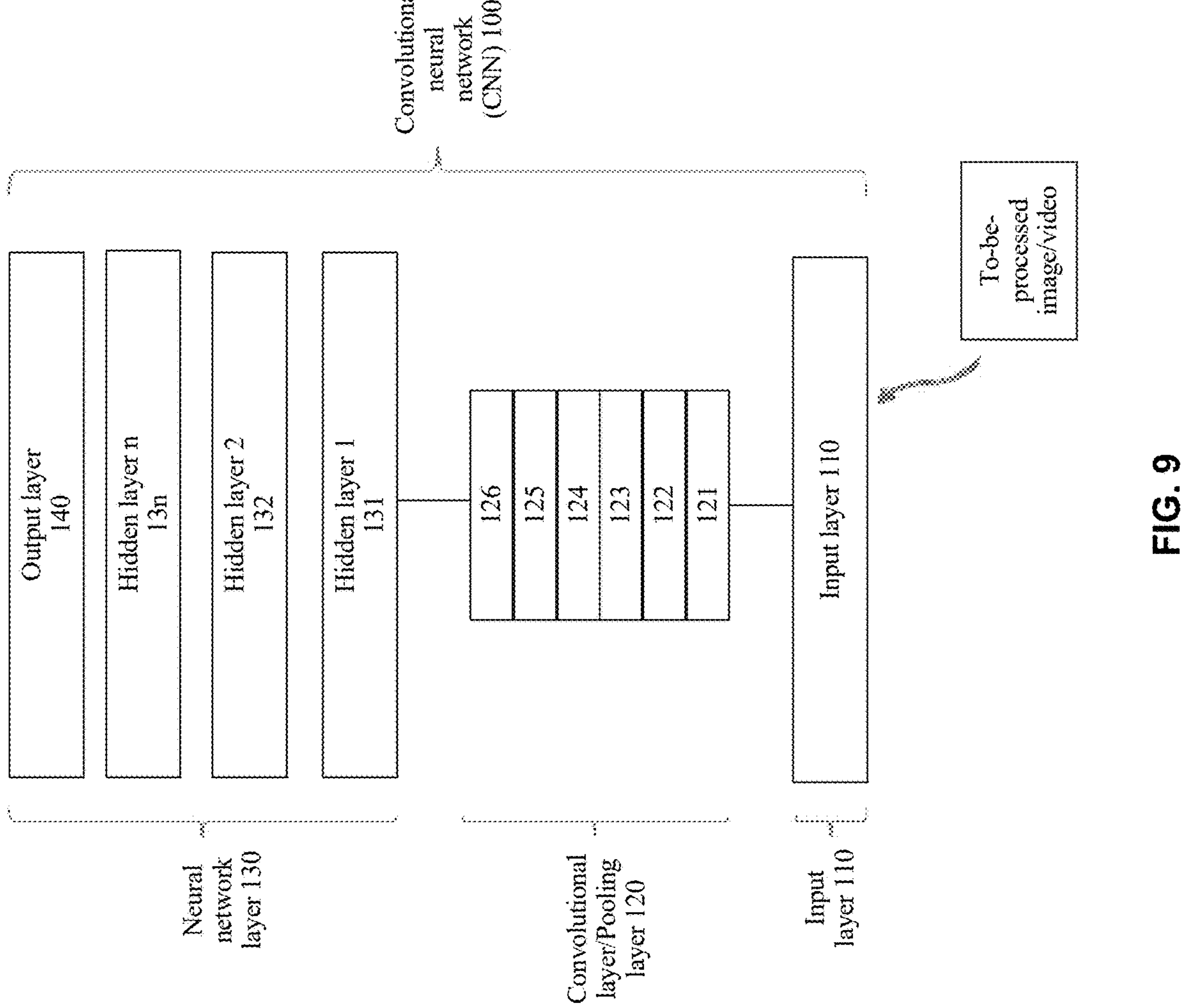
FIG. 9 is a schematic structural diagram of a convolutional neural network according to embodiments.

In some embodiments, convolutional neural network-based algorithms shown in FIG. 9 can be implemented by the NPU chip shown in FIG. 8. A convolutional neural network (CNN) is a deep neural network with a convolutional structure, and is a deep learning (DL) architecture. The deep learning architecture indicates that a plurality of layers of learning is performed at different abstraction layers by using a machine learning algorithm. As a deep learning architecture, the CNN is a feed-forward (FF) artificial neural network. Each neural cell in the feed-forward artificial neural network responds to an overlapping area in an image input to the neural cells.

As shown in FIG. 9, a convolutional neural network (CNN) 100 may include an input layer 110, a convolutional layer/pooling layer 120, and a neural network layer 130. The pooling layer may be optional.

The convolutional layer/pooling layer 120 shown in FIG. 9 may include, for example, layers 121 to 126. In an implementation, the layer 121 is a convolutional layer, the layer 122 is a pooling layer, the layer 123 is a convolutional layer, the layer 124 is a pooling layer, the layer 125 is a convolutional layer, and the layer 126 is a pooling layer. In another implementation, the layers 121 and 122 are convolutional layers, the layer 123 is a pooling layer, the layers 124 and 125 are convolutional layers, and the layer 126 is a pooling layer. In other words, an output from a convolutional layer may be used as an input to a following pooling layer, or may be used as an input to another convolutional layer, to continue a convolution operation.

The convolutional layer 121 is used as an example. The convolutional layer 121 may include a plurality of convolutional operators. The convolutional operator is also referred to as a kernel. A role of the convolutional operator in image processing is equivalent to a filter that extracts specific information from an input image matrix. In essence, the convolutional operator may be a weight matrix. The weight matrix is usually predefined. In a process of performing a convolution operation on an image, the weight matrix is usually processed one pixel after another (or two pixels after two pixels . . . , depending on a value of a stride) in a horizontal direction on the input image, to extract a specific feature from the image. A size of the weight matrix needs to be related to a size of the image. It should be noted that a depth dimension of the weight matrix is the same as a depth dimension of the input image. In the convolution operation process, the weight matrix extends to the entire depth of the input image. Therefore, after convolution is performed on a single weight matrix, convolutional output with a single depth dimension is output. However, the single weight matrix is not used in most cases, but a plurality of weight matrices with a same dimension are used. Outputs of the weight matrices are stacked to form the depth dimension of the convolutional image. Different weight matrices may be used to extract different features from the image. For example, one weight matrix is used to extract image edge information, another weight matrix is used to extract a specific color of the image, and still another weight matrix is used to blur unneeded noises from the image. The plurality of weight matrices have a same dimension. Feature diagrams obtained after extraction is performed by the plurality of weight matrices with the same dimension also have a same dimension, and the plurality of extracted feature diagrams with the same dimension are combined to form an output of the convolution operation.

Weight values in the weight matrices need to be obtained through a large amount of training in actual application. The weight matrices formed by the weight values obtained through training may be used to extract information from the input image, to help the convolutional neural network 100 perform accurate prediction.

When the convolutional neural network 100 has a plurality of convolutional layers, an initial convolutional layer (such as 121) usually extracts a relatively large quantity of common features. A common feature may also be referred to as a low-level feature. As a depth of the convolutional neural network 100 increases, a feature extracted by a deeper convolutional layer (such as 126) becomes more complex, for example a feature with high-level semantics or the like. A feature with higher-level semantics is more applicable to a to-be-resolved problem.

Because a quantity of training parameters usually needs to be reduced, a pooling layer usually needs to periodically follow a convolutional layer. To be specific, at the layers 121 to 126 shown in 120 in FIG. 9, one pooling layer may follow one convolutional layer, or one or more pooling layers may follow a plurality of convolutional layers. In an image processing process, an only purpose of the pooling layer is to reduce a space size of the image. The pooling layer may include an average pooling operator and/or a maximum pooling operator, to perform sampling on the input image to obtain an image of a relatively small size. The average pooling operator may calculate a pixel value in the image within a specific range, to generate an average value. The maximum pooling operator may obtain, as a maximum pooling result, a pixel with a largest value within the specific range. In addition, just like the size of the weight matrix in the convolutional layer needs to be related to the size of the image, an operator at the pooling layer also needs to be related to the size of the image. The size of the image output after processing by the pooling layer may be smaller than a size of the image input to the pooling layer. Each pixel in the image output by the pooling layer indicates an average value or a maximum value of a subarea corresponding to the image input to the pooling layer.

After the image is processed by the convolutional layer/pooling layer 120, the convolutional neural network 100 is still incapable of outputting desired output information. As described above, the convolutional layer/pooling layer 120 only extracts a feature, and reduces a parameter brought by the input image. However, to generate final output information (e.g. desired category information or other related information), the convolutional neural network 100 needs to generate output of a quantity of one or a group of desired categories by using the neural network layer 130. Therefore, the neural network layer 130 may include a plurality of hidden layers (such as 131, 132, to **13*n* in FIG. 9) and an output layer 140**. A parameter included in the plurality of hidden layers may be obtained by performing pre-training based on related training data of a specific task type. For example, the task type may include image recognition, image classification, image super-resolution re-setup, and the like.

The output layer 140 follows the plurality of hidden layers in the neural network layers 130. In other words, the output layer 140 is a final layer in the entire convolutional neural network 100. The output layer 140 has a loss function similar to category cross-entropy and is specifically used to calculate a prediction error. Once forward propagation (e.g. propagation from 110 to 140 in FIG. 9) is complete in the entire convolutional neural network 100, back propagation (e.g. propagation from 140 to 110 in FIG. 9) starts to update the weight values and offsets of the foregoing layers, to reduce a loss of the convolutional neural network 100 and an error between an ideal result and a result output by the convolutional neural network 100 by using the output layer.

It should be noted that the convolutional neural network 100 shown in FIG. 9 is merely used as an example of a convolutional neural network. In actual application, a convolutional neural network may exist in a form of another network model. For example, a plurality of convolutional layers/pooling layers are configured in parallel, and separately extracted features are all input to the neural network layer 130 for processing.

Operations at the layers of the convolutional neural networks may be performed by a matrix computation unit or the vector computation unit 507.

It is also to be understood that other formats of neural networks can be equally applicable, for example a recurrent neural network (RNN) or a generative adversarial network (GAN) or other neural network configuration as would be readily understood.

Figure 10:
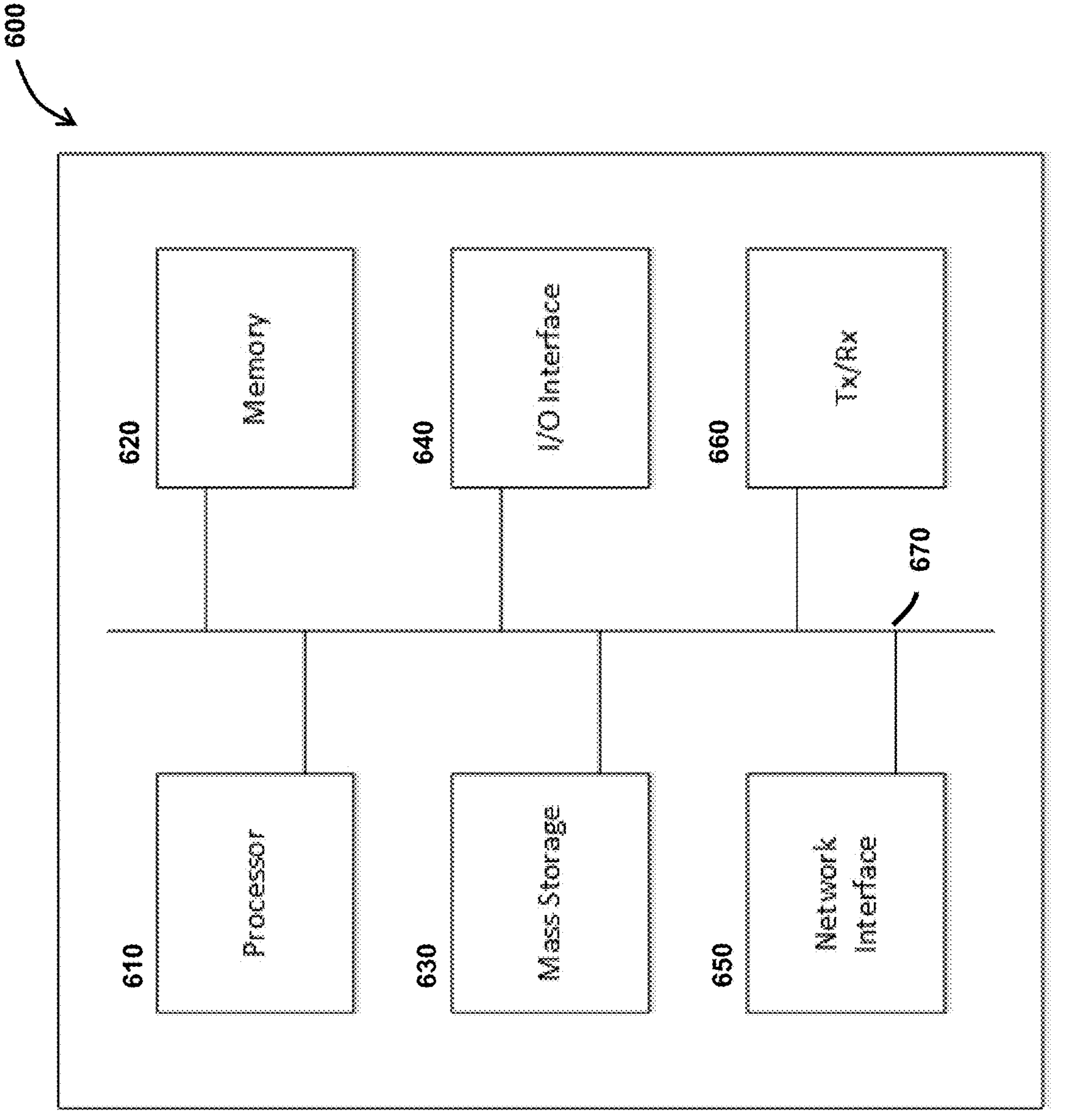
FIG. 10 is a schematic diagram of an electronic device that may perform any or all of operations of the above methods and features explicitly or implicitly described herein, according to different embodiments.

FIG. 10 is a schematic diagram of an electronic device 600 that may perform any or all of operations of the above methods and features explicitly or implicitly described herein, according to different embodiments. For example, a computer equipped with network function may be configured as electronic device 600.

As shown, the device includes a processor 610, such as a central processing unit (CPU) or specialized processors such as a graphics processing unit (GPU) or other such processor unit, memory 620, non-transitory mass storage 630, I/O interface 640, network interface 650, and a transceiver 660, all of which are communicatively coupled via bi-directional bus 670. According to certain embodiments, any or all of the depicted elements may be utilized, or only a subset of the elements. Further, the device 600 may contain multiple instances of certain elements, such as multiple processors, memories, or transceivers. Also, elements of the hardware device may be directly coupled to other elements without the bi-directional bus. Additionally or alternatively to a processor and memory, other electronics, such as integrated circuits, may be employed for performing the required logical operations.

The memory 620 may include any type of non-transitory memory such as static random access memory (SRAM), dynamic random access memory (DRAM), synchronous DRAM (SDRAM), read-only memory (ROM), any combination of such, or the like. The mass storage element 630 may include any type of non-transitory storage device, such as a solid state drive, hard disk drive, a magnetic disk drive, an optical disk drive, USB drive, or computer program product configured to store data and machine executable program code. According to certain embodiments, the memory 620 or mass storage 630 may have recorded thereon statements and instructions executable by the processor 610 for performing any of the aforementioned method operations described above.

It will be appreciated that, although specific embodiments of the technology have been described herein for purposes of illustration, various modifications may be made without departing from the scope of the technology. The specification and drawings are, accordingly, to be regarded simply as an illustration of the invention as defined by the appended claims, and are contemplated to cover any and all modifications, variations, combinations or equivalents that fall within the scope of the present invention. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A method of training a neural processing unit (NPU) for graphics rendering, the method comprising: receiving, by the NPU, reference information indicating three-dimensional (3D) properties of a 3D scene; receiving, by the NPU from a graphics processing unit (GPU); a plurality of two-dimensional (2D) images of the 3D scene each rendered by the GPU for a respective viewpoint of the 3D scene, and rendering information including intermediate rendering results produced during rendering of the plurality of 2D images; and training, by the NPU, a neural network model at the NPU to infer new images of the 3D scene for respective viewpoints of the 3D scene different from the respective viewpoint of each 2D image of the plurality of 2D images rendered by the GPU, the training based on the plurality of 2D images, the reference information, and the rendering information.

2. The method of claim 1, wherein the reference information indicating 3D properties of the 3D scene includes one or more of mesh information, texture information, camera pose information and material information.

3. The method of claim 1 wherein training, by the NPU, the neural network model includes:

modifying, by the NPU, the neural network model based at least in part on the plurality of 2D images received from the GPU.

4. The method of claim 1, wherein the neural network model is a neural radiance field (NeRF).

5. The method of claim 1, wherein training, by the NPU, the neural network model includes:

generating, by the NPU using the neural network model, at least one new 2D image of the 3D scene for the respective viewpoint of a corresponding at least one 2D image among the plurality of 2D images rendered by the GPU.

6. The method of claim 5 wherein training by the NPU, the neural network model includes:

evaluating, by the NPU, an accuracy of the neural network model, the evaluating based at least in part on a comparison of the at least one new 2D image and the at least one 2D image among the plurality of 2D images rendered by the GPU.

7. The method of claim 6, wherein upon the accuracy reaching a threshold, the method further comprises;

receiving, by the NPU, a request for inferring one or more new images of the 3D scene, each of the one or more new images being for a respective viewpoint of the 3D scene different from the respective viewpoint of each 2D image of the plurality of 2D images rendered by the GPU; and inferring, by the NPU using the neural network model, the one or more new images of the 3D scene.

8. A neural processing unit (NPU) comprising:

a processor; and a memory storing instructions thereon, the instructions when executed by the processor configure the NPU to:

receive reference information indicating three-dimensional (3D) properties of a 3D scene;

receive from a graphics processing unit (GPU):

a plurality of two-dimensional (2D) images of the 3D scene each rendered by the GPU for a respective viewpoint of the 3D scene, and rendering information including intermediate rendering results produced during rendering of the plurality of 2D images; and train, based on the plurality of 2D images, the reference information, and the rendering information, a neural network model at the NPU to infer new images of the 3D scene for respective viewpoints of the 3D scene different from the respective viewpoint of each 2D image of the plurality of 2D images rendered by the GPU.

9. The NPU of claim 8, wherein the reference information indicating 3D properties of the 3D scene includes one or more of mesh information, texture information, camera pose information and material information.

10. The NPU of claim 8, wherein the the NPU being configured to train the neural network model includes the NPU being configured to:

modify the neural network model based at least in part on the plurality of 2D images received from the GPU.

11. The NPU of claim 10, wherein the NPU being configured to train the neural network model includes the NPU being configured to:

generate, using the neural network model, at least one new 2D image of the 3D scene for the respective viewpoint of a corresponding at least one 2D image among the plurality of 2D images rendered by the GPU.

12. The NPU of claim 11, wherein the NPU being configured to train the neural network model includes the NPU being configured to:

evaluate an accuracy of the neural network model, the evaluating based at least in part on a comparison of the at least one new 2D image and the at least one 2D image among the plurality of 2D images rendered by the GPU.

13. The NPU of claim 12, wherein the instructions when executed by the processor further configure the NPU to, upon the accuracy reaching a threshold:

receive a request for inferring one or more new images of the 3D scene, each of the one or more new images being for a respective viewpoint of each 2D image of the plurality of 2D images rendered by the GPU; and infer, using the neural network model, the one or more new images of the 3D scene.

14. The NPU of claim 8, wherein the neural network model is a neural radiance field (NeRF).

15. A system for training a neural processing unit (NPU) for graphics rendering, the system comprising a graphics processing unit (GPU) communicatively linked to a neural processing unit (NPU), wherein the GPU is configured to:

receive a plurality of viewpoints for a three-dimensional (3D) scene;

render a plurality of two-dimensional (2D) images of the 3D scene corresponding to the plurality of viewpoints; and transmit the plurality of 2D images and rendering information to the NPU, the rendering information including intermediate rendering results produced during the rendering of the plurality of 2D images; and the NPU is configured to:

receive the plurality of 2D images of the 3D scene from the GPU;

receive reference information indicating 3D properties of the 3D scene;

receive the rendering information from the GPU;

train, based on the plurality of 2D images, the reference information, and the rendering information a neural network model to infer new images of the 3D scene for respective viewpoints of the 3D scene different from the respective viewpoint of each 2D image of the plurality of 2D images rendered by the GPU.

16. The system of claim 15, wherein the reference information includes one or more of mesh information, texture information, camera pose information, and material information.

17. The system of claim 15, wherein the NPU being configured to train the neural network model includes being configured to modify the neural network model based at least in part on the plurality of 2D images received from the GPU.

18. The system of claim 15, wherein the NPU being configured to train the neural network includes being configured to:

generate, using the neural network model, at least one new 2D image of the 3D scene for the respective viewpoint of a corresponding at least one 2D image among the plurality of 2D images rendered by the GPU; and evaluate an accuracy of the neural network model, based at least in part on a comparison of the at least one new 2D image and the at least one 2D image among the plurality of 2D images rendered by the GPU.

19. The system of claim 15, wherein the GPU and the NPU are operatively connected to a rendering application program interface.

* * * * *